(12) United States Patent
Castillo

(10) Patent No.: US 10,791,725 B2
(45) Date of Patent: Oct. 6, 2020

(54) ROD HOLDING ASSEMBLY

(71) Applicant: Mario Castillo, Crosby, TX (US)

(72) Inventor: Mario Castillo, Crosby, TX (US)

( * ) Notice: Subject to any disclaimer, the term of this patent is extended or adjusted under 35 U.S.C. 154(b) by 524 days.

(21) Appl. No.: 15/671,266

(22) Filed: Aug. 8, 2017

(65) Prior Publication Data

US 2019/0045769 A1    Feb. 14, 2019

(51) Int. Cl.
| | |
|---|---|
| *A01K 97/10* | (2006.01) |
| *A01K 97/22* | (2006.01) |
| *A01K 97/06* | (2006.01) |
| *A01K 97/08* | (2006.01) |
| *A01K 97/00* | (2006.01) |

(52) U.S. Cl.
CPC .............. *A01K 97/10* (2013.01); *A01K 97/06* (2013.01); *A01K 97/08* (2013.01); *A01K 97/22* (2013.01); *A01K 97/00* (2013.01)

(58) Field of Classification Search
CPC ........ A01K 97/22; A01K 97/10; A01K 97/06; A47C 7/62
USPC ................. 43/21.2, 54.1; 297/188.2, 188.01, 297/188.08, 188; 248/312.1, 512
See application file for complete search history.

(56) References Cited

U.S. PATENT DOCUMENTS

| | | | | |
|---|---|---|---|---|
| 981,631 | A * | 1/1911 | Fraser ..................... | A01K 97/10 248/515 |
| 1,406,571 | A * | 2/1922 | McCoy ................. | A01K 97/10 297/188.21 |
| 2,529,148 | A * | 11/1950 | Fratt ...................... | A01K 97/10 248/515 |
| 2,734,555 | A * | 2/1956 | Kroner ................... | B63B 29/04 248/520 |
| 2,918,237 | A * | 12/1959 | Boesch .................. | A01K 97/10 248/517 |
| 3,151,910 | A * | 10/1964 | Larson ................... | A47C 7/506 297/344.22 |
| 3,628,204 | A * | 12/1971 | Hoffman, Jr. ........... | B63B 35/14 114/343 |
| 3,967,694 | A * | 7/1976 | Woolfolk, Sr. ........ | A01K 97/22 182/82 |
| 4,086,676 | A * | 5/1978 | Arruza ................... | A01K 97/10 114/363 |
| 4,106,811 | A * | 8/1978 | Hernandez ............. | A01K 97/10 248/538 |
| 4,157,803 | A * | 6/1979 | Mack ..................... | A01K 97/10 211/70.8 |
| 4,157,804 | A * | 6/1979 | Byford .................. | A01K 97/10 248/231.51 |

(Continued)

FOREIGN PATENT DOCUMENTS

| | | | | |
|---|---|---|---|---|
| CA | 2499989 | A1 * | 12/2005 | ............ A01K 97/10 |
| FR | 2438423 | A1 * | 5/1980 | ............ A01K 97/10 |

(Continued)

*Primary Examiner* — Darren W Ark

(57) ABSTRACT

A rod holding assembly for coupling fishing rods to a chair includes a panel that is configured to couple to a chair, such as a boat seat, a lawn chair, and a wheelchair. The panel is rigid. A plurality of fasteners is coupled to an upper face of the panel. Each fastener is configured to selectively couple to a handle of a respective fishing pole to couple the respective fishing pole to the panel. A plurality of couplers is coupled to the panel. Each coupler is configured to couple to a respective cup to couple the respective cup to the panel.

11 Claims, 5 Drawing Sheets

(56) References Cited

U.S. PATENT DOCUMENTS

| | | | | |
|---|---|---|---|---|
| 4,388,774 A * | 6/1983 | Thoemke | A01K 91/08 114/255 |
| 4,428,617 A * | 1/1984 | Lawson | A01K 97/06 114/363 |
| 4,485,579 A * | 12/1984 | Hawie | A01K 97/10 248/512 |
| 4,500,059 A * | 2/1985 | Papizan | A01K 97/06 206/315.11 |
| 4,551,939 A * | 11/1985 | Kitchens | A01K 97/10 248/513 |
| 4,640,038 A * | 2/1987 | Jershin | A01K 97/10 43/16 |
| 4,645,167 A * | 2/1987 | Hardwick | B63B 29/04 248/283.1 |
| 4,682,813 A * | 7/1987 | Fohr | A01K 97/06 108/151 |
| 4,753,029 A * | 6/1988 | Shaw | A01K 97/10 248/538 |
| 4,827,654 A * | 5/1989 | Roberts | A01K 97/10 248/514 |
| 4,869,195 A * | 9/1989 | Eichfeld | A01K 97/10 114/364 |
| 4,887,379 A * | 12/1989 | Harrison | A01K 97/06 43/54.1 |
| 4,901,469 A * | 2/1990 | Murray | A01K 91/08 43/21.2 |
| 4,999,943 A * | 3/1991 | Crabtree | A01K 97/06 43/54.1 |
| 5,120,016 A | 6/1992 | Dysarz | |
| 5,142,809 A * | 9/1992 | O'Brien | A01K 97/10 248/514 |
| 5,163,652 A * | 11/1992 | King | A01K 97/10 248/231.61 |
| 5,481,822 A * | 1/1996 | Engels | A01K 97/06 297/188.12 |
| 5,560,145 A * | 10/1996 | Anderson | A01K 97/06 403/373 |
| 5,577,458 A * | 11/1996 | Kohl | A47B 83/00 114/363 |
| D381,392 S * | 7/1997 | Darling | D22/147 |
| 5,673,507 A * | 10/1997 | Stokes, Jr. | A01K 97/10 114/364 |
| 5,685,107 A * | 11/1997 | Sweet | A01K 97/10 43/21.2 |
| 5,899,527 A * | 5/1999 | Elvidge | A01K 97/22 248/538 |
| D414,239 S * | 9/1999 | Lovelady | D22/147 |
| 5,987,804 A * | 11/1999 | Shearer | A01K 97/10 43/21.2 |
| 5,992,081 A * | 11/1999 | Elkins | A01K 97/10 43/21.2 |
| 6,042,180 A * | 3/2000 | Lombardi | A01K 97/22 248/538 |
| 6,052,937 A * | 4/2000 | Morong | A01K 97/10 43/21.2 |
| 6,119,812 A * | 9/2000 | Chin | A01M 31/02 182/223 |
| 6,289,627 B1 * | 9/2001 | Gibbs | A01K 97/10 43/21.2 |
| 6,302,367 B1 * | 10/2001 | Ratza | A01K 97/10 248/515 |
| 6,357,166 B1 * | 3/2002 | Malmanger | A01K 97/10 43/21.2 |
| D456,974 S | 5/2002 | Hicks | |
| 6,591,541 B1 * | 7/2003 | Cummings | A01K 97/10 248/514 |
| 6,681,517 B1 * | 1/2004 | Solomon | A01K 97/10 43/21.2 |
| 6,808,231 B1 * | 10/2004 | Hill | B60R 9/06 296/26.09 |
| 6,983,560 B2 * | 1/2006 | Williams | A01K 97/10 248/512 |
| 7,047,688 B2 * | 5/2006 | Sandman, Jr. | A01K 97/10 248/512 |
| 7,146,927 B1 * | 12/2006 | Wright | A01K 97/06 114/364 |
| D564,617 S * | 3/2008 | White | D22/147 |
| 7,392,612 B2 * | 7/2008 | Winkler | A01K 97/06 297/188.21 |
| 7,650,713 B1 * | 1/2010 | Peede | A01K 97/10 43/21.2 |
| 7,686,276 B1 * | 3/2010 | McCauley | A01K 97/10 248/535 |
| 7,707,765 B2 * | 5/2010 | Liao | A01K 97/10 43/21.2 |
| 8,028,463 B2 | 10/2011 | Watson | |
| 8,157,239 B2 * | 4/2012 | Owen | A01K 97/10 248/512 |
| 8,297,699 B1 * | 10/2012 | Midkiff | A01K 97/22 297/143 |
| 9,357,756 B2 * | 6/2016 | Davis | A01K 97/04 |
| 9,586,657 B1 * | 3/2017 | Dykes | A01K 97/10 |
| D820,382 S * | 6/2018 | Pratt | D22/147 |
| D822,787 S * | 7/2018 | Cipolla | D22/147 |
| 10,362,775 B1 * | 7/2019 | Begin | A01K 97/10 |
| 10,405,531 B1 * | 9/2019 | Denmark | A01K 97/06 |
| 2007/0283614 A1 * | 12/2007 | Kessler | A01K 97/06 43/54.1 |
| 2009/0139132 A1 * | 6/2009 | Knight | A01K 97/04 43/54.1 |
| 2010/0313464 A1 * | 12/2010 | Bain | A01K 97/06 43/54.1 |
| 2011/0185621 A1 * | 8/2011 | Lamb | A01K 97/10 43/21.2 |
| 2011/0197494 A1 * | 8/2011 | Schumacher | A01K 97/06 43/54.1 |
| 2011/0203155 A1 * | 8/2011 | Simmons | A01K 97/10 43/17 |
| 2012/0186619 A1 * | 7/2012 | Makos | A01K 97/01 135/96 |
| 2012/0193951 A1 * | 8/2012 | Solomon | A01K 97/10 297/188.01 |
| 2014/0033600 A1 * | 2/2014 | McCorkle | A01K 97/10 43/21.2 |
| 2014/0047758 A1 * | 2/2014 | Ciciulla | A01K 97/10 43/21.2 |
| 2014/0203600 A1 * | 7/2014 | Rushing | A01K 97/22 297/188.21 |
| 2015/0208634 A1 * | 7/2015 | Box | A01K 97/10 108/25 |
| 2015/0216157 A1 * | 8/2015 | Flanagan | A01K 97/10 43/27.4 |
| 2017/0245486 A1 * | 8/2017 | Larson | A01K 97/10 |
| 2018/0020652 A1 * | 1/2018 | Morehead | A01K 97/10 43/21.2 |
| 2018/0110335 A1 * | 4/2018 | O'Hagan | A01K 97/22 |
| 2018/0146655 A1 * | 5/2018 | Crossen | A01K 97/10 |
| 2019/0059347 A1 * | 2/2019 | McPherson | A01K 97/06 |
| 2019/0125085 A1 * | 5/2019 | O'Neal | A47C 7/68 |

FOREIGN PATENT DOCUMENTS

| | | | | |
|---|---|---|---|---|
| GB | 2394505 B * | 6/2005 | | A01K 97/22 |
| JP | 8008634 Y2 * | 3/1996 | | |
| JP | 2002300835 A * | 10/2002 | | |
| KR | 20060040475 A * | 5/2006 | | |
| KR | 20090092554 A * | 9/2009 | | |
| KR | 100951282 B1 * | 4/2010 | | |
| KR | 200464988 Y1 * | 1/2013 | | |
| KR | 101255583 B1 * | 4/2013 | | |
| KR | 101347160 B1 * | 1/2014 | | |
| KR | 101378553 B1 * | 3/2014 | | |

* cited by examiner

ROD HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

Field of the Invention

The disclosure relates to rod holding assemblies and more particularly pertains to a new rod holding assembly for coupling fishing rods to a chair.

Description of Related Art Including Information Disclosed Under 37 CFR 1.97 and 1.98

The prior art relates to rod holding assemblies.

BRIEF SUMMARY OF THE INVENTION

An embodiment of the disclosure meets the needs presented above by generally comprising a panel that is configured to couple to a chair, such as a boat seat, a lawn chair, and a wheelchair. The panel is rigid. A plurality of fasteners is coupled to an upper face of the panel. Each fastener is configured to selectively couple to a handle of a respective fishing pole to couple the respective fishing pole to the panel. A plurality of couplers is coupled to the panel. Each coupler is configured to couple to a respective cup to couple the respective cup to the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
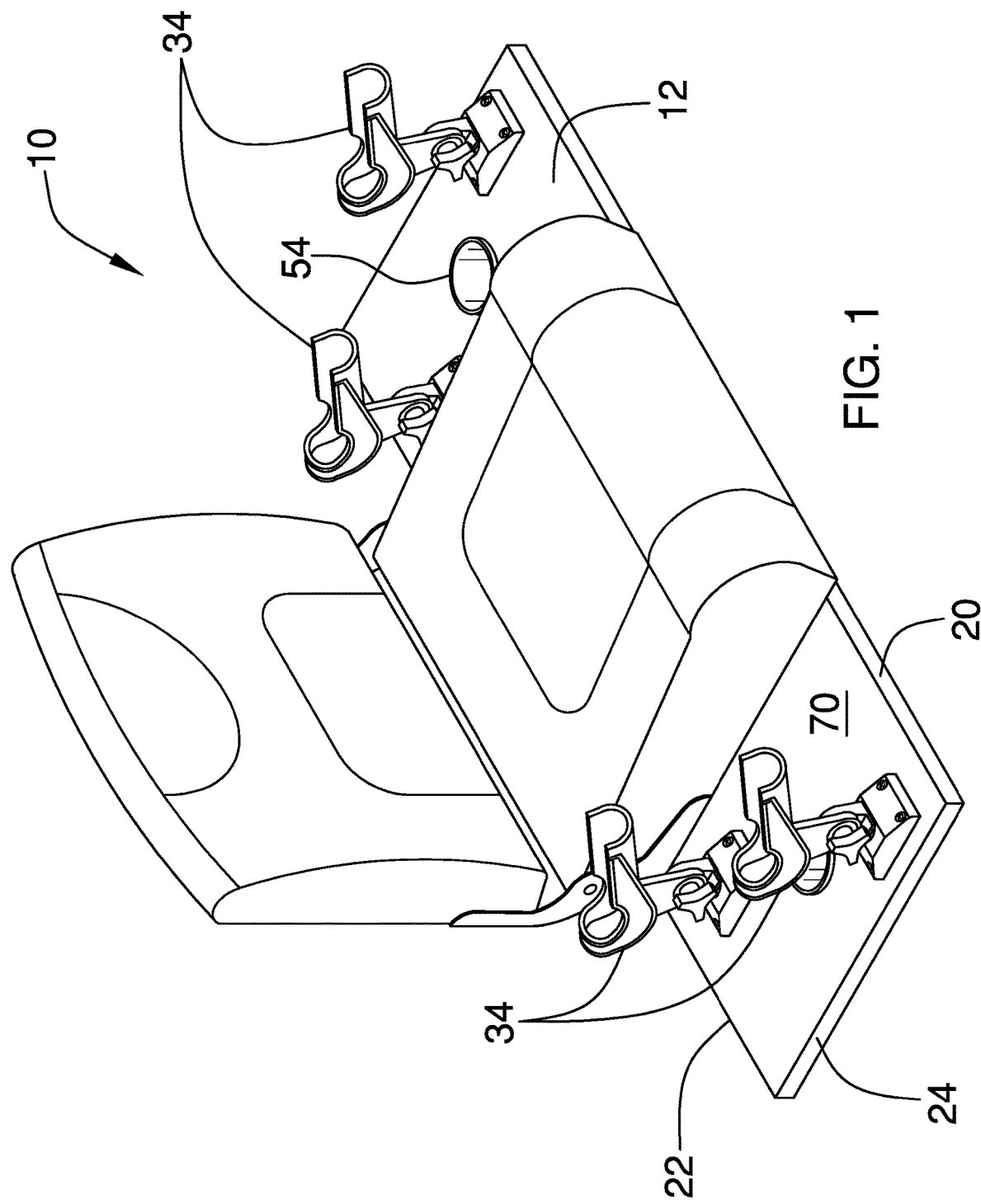
FIG. 1 is an isometric perspective view of a rod holding assembly according to an embodiment of the disclosure.
Figure 2:
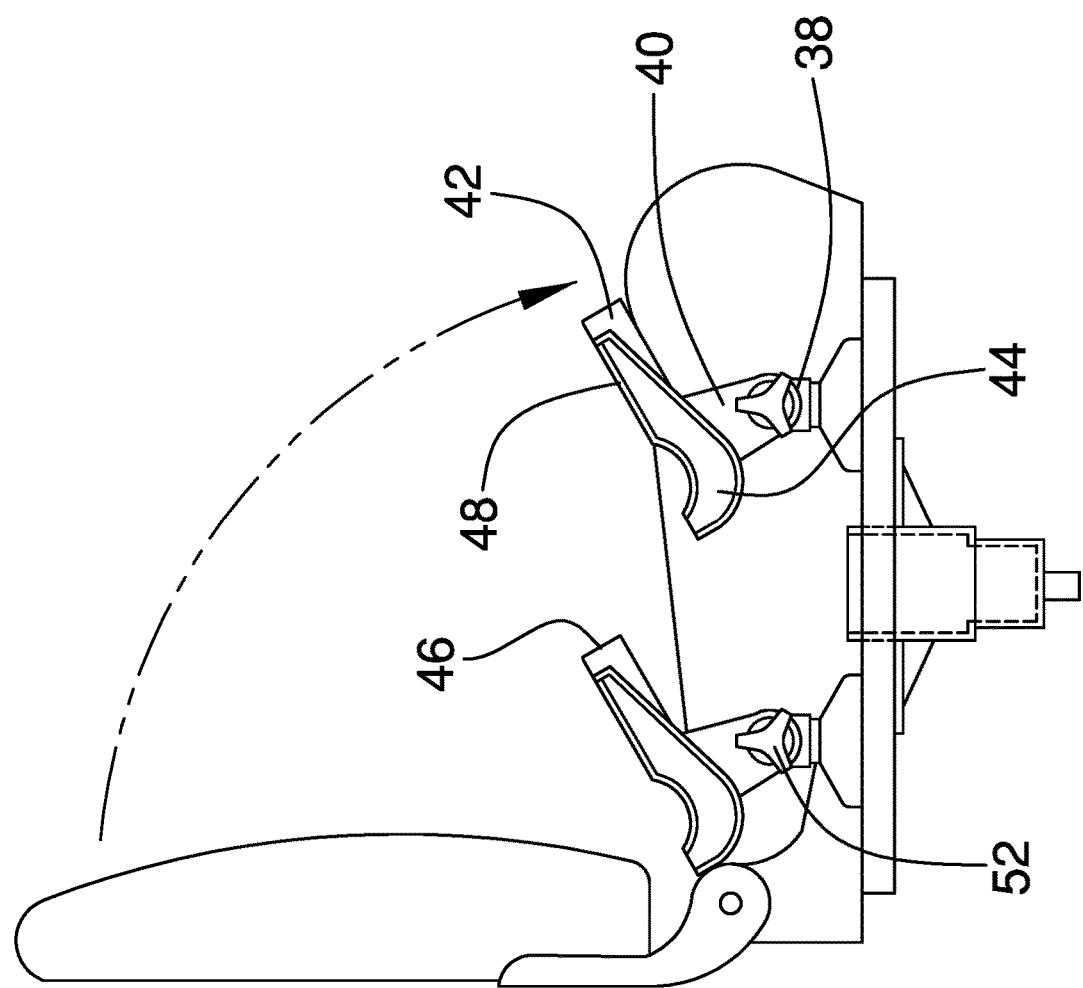
FIG. 2 is a side view of an embodiment of the disclosure.
Figure 3:
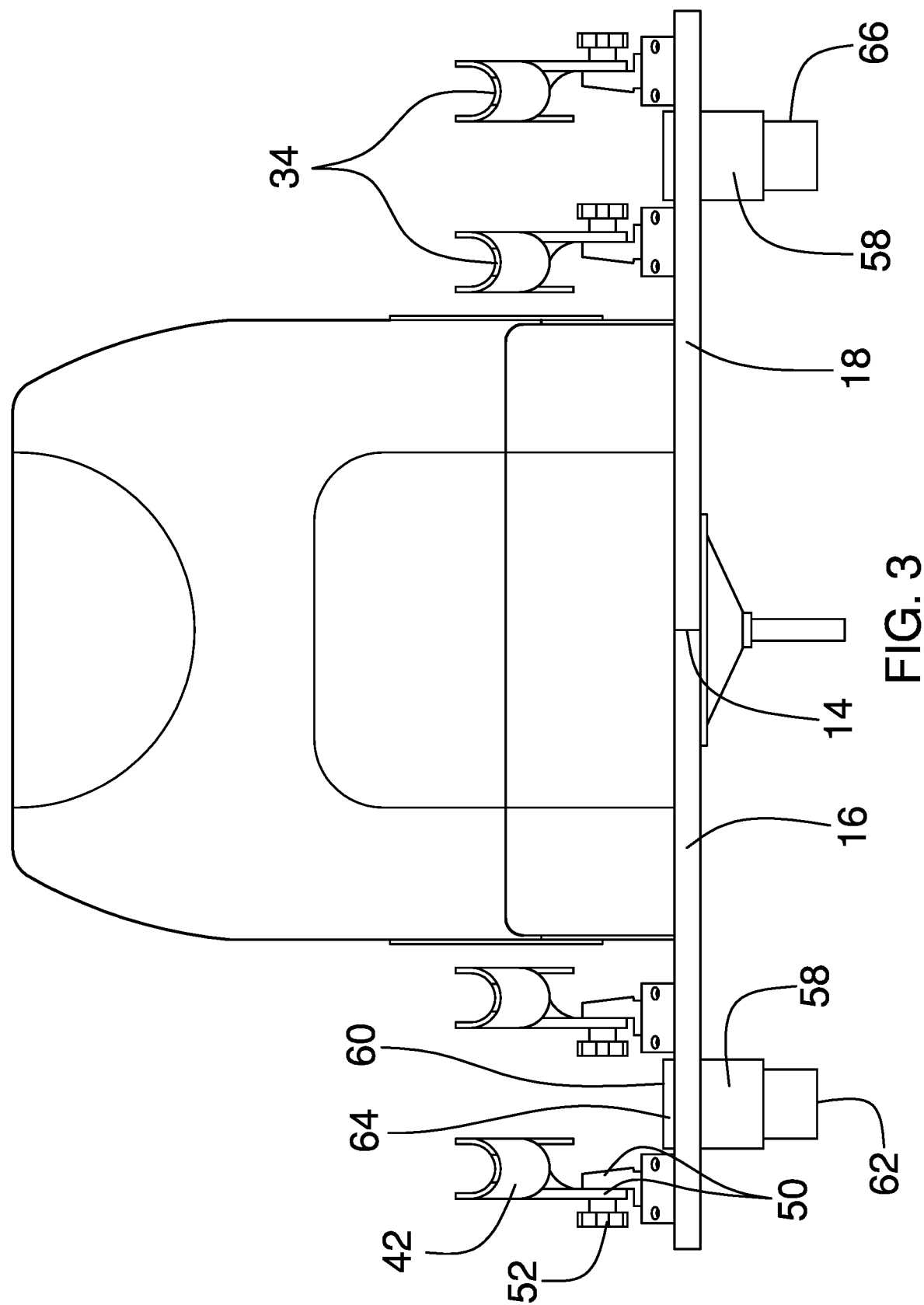
FIG. 3 is a front view of an embodiment of the disclosure.
Figure 4:
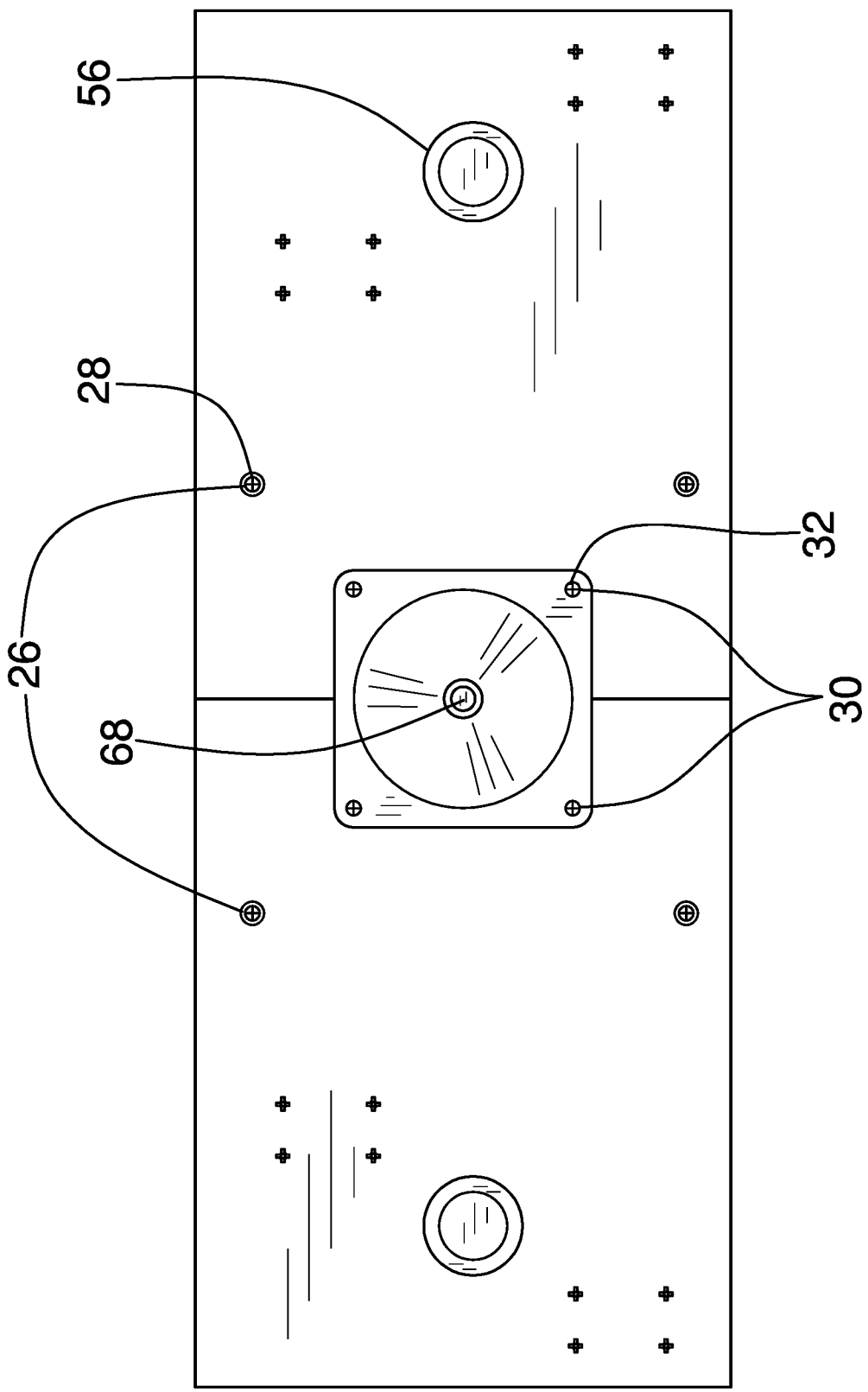
FIG. 4 is a bottom view of an embodiment of the disclosure.
Figure 5:
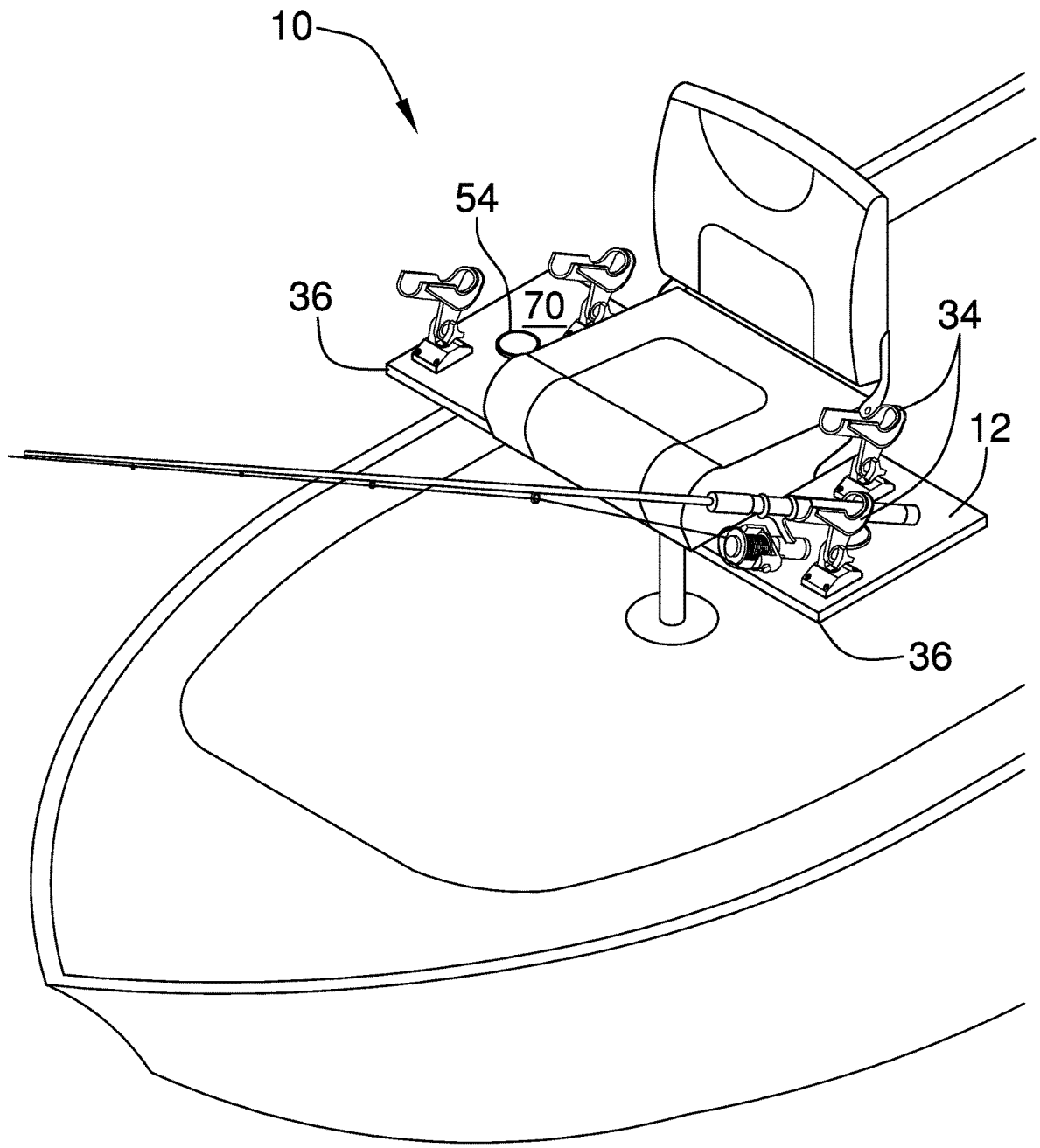
FIG. 5 is an in-use view of an embodiment of the disclosure.

With reference now to the drawings, and in particular to FIGS. 1 through 5 thereof, a new rod holding assembly embodying the principles and concepts of an embodiment of the disclosure and generally designated by the reference numeral 10 will be described.

As best illustrated in FIGS. 1 through 5, the rod holding assembly 10 generally comprises a panel 12 that is configured to couple to a chair, such as a boat seat, a lawn chair, and a wheelchair. The panel 12 is rigid. In one embodiment, the panel 12 is rectangularly shaped.

In another embodiment, a separation 14 is positioned in the panel 12 and defines a first section 16 and a second section 18 of the panel 12. The first section 16 and the second section 18 are configured to couple to opposing sides of the lawn chair. The separation 14 extends from a first edge 20 of the panel 12 to a second edge 22 of the panel 12. In yet another embodiment, the separation 14 is positioned equally distant from opposing ends 24 of the panel 12. The first section 16 and the second section 18 are dimensionally equivalent.

A plurality of first holes 26 is positioned in the panel 12. Each first hole 26 is positioned to threadedly insert a respective first screw 28 through the first hole 26 into a respective first penetration that is positioned in a base of the chair to couple the panel 12 to the base of the chair. In one embodiment, the plurality of first holes 26 comprises four first holes 26 that are positioned two apiece proximate to the first edge 20 and the second edge 22 of the panel 12. Each first hole 26 is positionable proximate to a respective corner of the base of the chair to align the first holes 26 with the first penetrations that are positioned in the base.

A plurality of second holes 30 is positioned in the panel 12. Each second hole 30 is positioned to align with a respective second penetration that is positioned through a bracket that is coupled to a seat post of a boat. The second hole 30 and the respective second penetration are configured to threadedly insert a respective second screw 32 through the respective second penetration into the second hole 30 to couple the panel 12 to the bracket. In one embodiment, the plurality of second holes 30 comprises four second holes 30 that are arrayed squarely around a center 68 of the panel 12. Each second hole 30 is positionable proximate to a respective corner of the bracket to align the second holes 30 with the second penetrations that are positioned in the bracket.

A plurality of fasteners 34 is coupled to an upper face 70 of the panel 12. Each fastener 34 is configured to selectively couple to a handle of a respective fishing pole to couple the respective fishing pole to the panel 12. In one embodiment, the plurality of fasteners 34 comprises two fasteners 34 that are positioned singly proximate to front corners 36 of the panel 12. The plurality of fasteners 34 also comprises two fasteners 34 that are positioned singly proximate to the second edge 22 of the panel 12 and a seat that is coupled to the upper face 70 of the panel 12.

In one embodiment, each fastener 34 comprises a first bar 38 that is coupled to and extends from the panel 12. A second bar 40 is pivotally coupled to the first bar 38. A cylinder 42 is coupled to the second bar 40 distal from the first bar 38. The second bar 40 is positioned proximate to a first end 44 of the cylinder 42. The first end 44 and a second end 46 of the cylinder 42 are open. The cylinder 42 has a top 48. The top 48 is open from proximate to the first end 44 to the second end 46. The cylinder 42 is configured to insert the handle of the respective fishing pole to couple the respective fishing pole to the panel 12. The second bar 40 is configured to selectively pivot so that the cylinder 42 is selectively angularly positionable relative to the panel 12.

In another embodiment, a channel 50 extends through the first bar 38 and the second bar 40. The channel 50 is internally threaded. The channel 50 is positioned to threadedly insert a thumbscrew 52, which is complementary to the channel 50, to couple the second bar selectively and fixedly 40 to the first bar 38 and to fixedly position the cylinder 42 relative to the panel 12.

A plurality of couplers 54 is coupled to the panel 12. Each coupler 54 is configured to couple to a respective cup to couple the respective cup to the panel 12. In one embodiment, the plurality of couplers 54 comprises two couplers 54. Each coupler 54 is positioned on the panel 12 so that two fasteners 34 bracket the coupler 34.

In another embodiment, each coupler 54 comprises an orifice 56 and a tube 58. The orifice 56 is positioned through the panel 12. The tube 58 is substantially complementary to the orifice 56. The tube 58 has an upper end 60 that is open and a lower end 62 that is closed. The orifice 56 is positioned to insert the tube 58. A lip 64 is coupled to and extends radially from the upper end 60 of the tube 58. The lip 64 is positioned to contact the panel 12 to couple the tube 58 to the panel 12. The tube 58 is configured to selectively insert the cup and articles, such as lures, to selectively couple the cup and the articles to the panel 12.

In yet another embodiment, the orifice 56 is circularly shaped. In still yet embodiment, a recess 66 is positioned in the tube 58 adjacent to the lower end 62 so that the tube 58 is circumferentially smaller adjacent to the lower end 62.

In use, each first hole 26 is positioned to threadedly insert the respective first screw 28 through the first hole 26 into the respective first penetration that is positioned in the base of the chair to couple the panel 12 to the base of the chair. Each second hole 30 is positioned to align with the respective second penetration that is positioned through the bracket that is coupled to the seat post of the boat. The second hole 30 and the respective second penetration are configured to threadedly insert the respective second screw 32 through the respective second penetration into the second hole 30 to couple the panel 12 to the bracket. Each cylinder 42 is configured to insert the handle of the respective fishing pole to couple the respective fishing pole to the panel 12. The associated second bar 40 is configured to selectively pivot so that the cylinder 42 is selectively angularly positionable relative to the panel 12. Each channel 50 is positioned to threadedly insert a respective thumbscrew 52 to couple the associated second bar selectively and fixedly 40 to the associated first bar 38. The cylinder 42 is fixedly positioned relative to the panel 12. Each orifice 56 is positioned to insert a respective tube 58. The lip 64 is positioned to contact the panel 12 to couple the respective tube 58 to the panel 12. The respective tube 58 is configured to selectively insert a respective cup and respective articles, such as respective lures, to selectively couple the respective cup and the respective articles to the panel 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A rod holding assembly comprising:
a panel configured for coupling to a chair, such as a boat seat, lawn chair, and a wheelchair, said panel being rigid;
a plurality of fasteners coupled to an upper face of said panel, each said fastener being configured for selectively coupling to a handle of a fishing pole for coupling the fishing pole to said panel;
a plurality of couplers coupled to said panel, each said coupler being configured for coupling to a cup for coupling the cup to said panel;
wherein said fasteners are positioned on said panel such that each said fastener is configured for selectively coupling to the handle of a respective fishing pole for coupling the respective fishing pole to said panel, wherein said couplers are positioned on said panel such that each said coupler is configured for coupling to a respective cup for coupling the respective cup to said panel;
a plurality of first holes positioned in said panel;
a plurality of second holes positioned in said panel;
wherein said first holes are positioned in said panel such that each said first hole is positioned for threadedly inserting a respective first screw through said first hole into a respective first penetration positioned in a base of the chair for coupling said panel to the base of the chair, wherein said second holes are positioned in said panel such that each said second hole is positioned for aligning with a respective second penetration positioned through a bracket coupled to a seat post of a boat such that said second hole and the respective second penetration are configured for threadedly inserting a respective second screw through the respective second penetration into said second hole for coupling said panel to the bracket;

said plurality of first holes comprising four said first holes positioned two apiece proximate to said first edge and said second edge of said panel such that each said first hole is positionable proximate to a respective corner of the base of the chair for aligning said first holes with the first penetrations positioned in the base; and said plurality of second holes comprising four said second holes arrayed squarely around a center of said panel such that each said second hole is positionable proximate to a respective corner of the bracket for aligning said second holes with the second penetrations positioned in the bracket.

2. The assembly of claim 1, further including said panel being rectangularly shaped.

3. The assembly of claim 1, further including a separation positioned in said panel defining a first section and a second section of said panel, wherein said separation is positioned in said panel such that said first section and said second section are configured for coupling to opposing sides of the lawn chair.

4. The assembly of claim 3, further including said separation extending from a first edge of said panel to a second edge of said panel, said separation being positioned equally distant from opposing ends of said panel such that said first section and said second section are dimensionally equivalent.

5. The assembly of claim 1, further comprising:
said plurality of fasteners comprising two said fasteners positioned singly proximate to front corners of said panel; and
said plurality of fasteners comprising two said fasteners positioned singly proximate to said second edge of said panel and a seat coupled to said upper face of said panel.

6. The assembly of claim 5, further including each said fastener comprising:
a first bar coupled to and extending from said panel;
a second bar pivotally coupled to said first bar;
a cylinder coupled to said second bar distal from said first bar, said second bar being positioned proximate to a first end of said cylinder, said first end and a second end of said cylinder being open, said cylinder having a top, said top being open from proximate to said first end to said second end; and
wherein said cylinder is positioned on said second bar such that said cylinder is configured for inserting the handle of a respective fishing pole for coupling the respective fishing pole to said panel, wherein said second bar is positioned on said first bar such that said second bar is configured for selectively pivoting such that said cylinder is selectively angularly positionable relative to said panel.

7. The assembly of claim 6, further including said plurality of couplers comprising two said couplers, each said coupler being positioned on said panel such that said coupler is bracketed by two said fasteners.

8. The assembly of claim 7, further including each said coupler comprising:
an orifice positioned through said panel;
a tube having an upper end and a lower end, said tube being substantially complementary to said orifice, said upper end being open, said lower end being closed;
a lip coupled to and extending radially from said upper end of said tube; and
wherein said orifice is positioned in said panel such that said orifice is positioned for inserting said tube, wherein said lip is positioned on said tube such that said lip is positioned for contacting said panel for coupling said tube to said panel such that said tube is configured for selectively inserting the cup and articles, such as lures, for selectively coupling the cup and the articles to said panel.

9. The assembly of claim 8, further including said orifice being circularly shaped.

10. The assembly of claim 9, further including a recess positioned in said tube adjacent to said lower end such that said tube is circumferentially smaller adjacent to said lower end.

11. A rod holding assembly comprising:
a panel configured for coupling to a chair, such as a boat seat, lawn chair, and a wheelchair, said panel being rigid, said panel being rectangularly shaped;
a separation positioned in said panel defining a first section and a second section of said panel, wherein said separation is positioned in said panel such that said first section and said second section are configured for coupling to opposing sides of the lawn chair, said separation extending from a first edge of said panel to a second edge of said panel, said separation being positioned equally distant from opposing ends of said panel such that said first section and said second section are dimensionally equivalent;
a plurality of first holes positioned in said panel, wherein said first holes are positioned in said panel such that each said first hole is positioned for threadedly inserting a respective first screw through said first hole into a respective first penetration positioned in a base of the chair for coupling said panel to the base of the chair, said plurality of first holes comprising four said first holes positioned two apiece proximate to said first edge and said second edge of said panel such that each said first hole is positionable proximate to a respective corner of the base of the chair for aligning said first holes with the first penetrations positioned in the base;
a plurality of second holes positioned in said panel, wherein said second holes are positioned in said panel such that each said second hole is positioned for aligning with a respective second penetration positioned through a bracket coupled to a seat post of a boat such that said second hole and the respective second penetration are configured for threadedly inserting a respective second screw through the respective second penetration into said second hole for coupling said panel to the bracket, said plurality of second holes comprising four said second holes arrayed squarely around a center of said panel such that each said second hole is positionable proximate to a respective corner of the bracket for aligning said second holes with the second penetrations positioned in the bracket;
a plurality of fasteners coupled to an upper face of said panel, each said fastener being configured for selectively coupling to a handle of a fishing pole for coupling the fishing pole to said panel, wherein said fasteners are positioned on said panel such that each said fastener is configured for selectively coupling to the handle of a respective fishing pole for coupling the respective fishing pole to said panel, said plurality of fasteners comprising two said fasteners positioned singly proximate to front corners of said panel, said plurality of fasteners comprising two said fasteners positioned singly proximate to said second edge of said panel and a seat coupled to said upper face of said panel, each said fastener comprising:
a first bar coupled to and extending from said panel, a second bar pivotally coupled to said first bar, and a cylinder coupled to said second bar distal from said first bar, said second bar being positioned proximate to a first end of said cylinder, said first end and a second end of said cylinder being open, said cylinder having a top, said top being open from proximate to said first end to said second end, wherein said cylinder is positioned on said second bar such that said cylinder is configured for inserting the handle of a respective fishing pole for coupling the respective fishing pole to said panel, wherein said second bar is positioned on said first bar such that said second bar is configured for selectively pivoting such that said cylinder is selectively angularly positionable relative to said panel, a plurality of couplers coupled to said panel, each said coupler being configured for coupling to a cup for coupling the cup to said panel, wherein said couplers are positioned on said panel such that each said coupler is configured for coupling to a respective cup for coupling the respective cup to said panel, said plurality of couplers comprising two said couplers, each said coupler being positioned on said panel such that said coupler is bracketed by two said fasteners, each said coupler comprising:

an orifice positioned through said panel, said orifice being circularly shaped, a tube having an upper end and a lower end, said tube being substantially complementary to said orifice, said upper end being open, said lower end being closed, wherein said orifice is positioned in said panel such that said orifice is positioned for inserting said tube, a recess positioned in said tube adjacent to said lower end such that said tube is circumferentially smaller adjacent to said lower end, and a lip coupled to and extending radially from said upper end of said tube, wherein said lip is positioned on said tube such that said lip is positioned for contacting said panel for coupling said tube to said panel such that said tube is configured for selectively inserting the cup and articles, such as lures, for selectively coupling the cup and the articles to said panel; and wherein said first holes are positioned in said panel such that each said first hole is positioned for threadedly inserting said respective said first screw through said first hole into the respective first penetration positioned in the base of the chair for coupling said panel to the base of the chair, wherein said second holes are positioned in said panel such that each said second hole is positioned for aligning with the respective second penetration positioned through the bracket coupled to the seat post of the boat such that said second hole and the respective second penetration are configured for threadedly inserting the respective second screw through the respective second penetration into said second hole for coupling said panel to the bracket, wherein each said cylinder is positioned on an associated said second bar such that said cylinder is configured for inserting the handle of the respective fishing pole for coupling the respective fishing pole to said panel, wherein the associated said second bar is positioned on an associated said first bar such that said associated said second bar is configured for selectively pivoting such that said cylinder is selectively angularly positionable relative to said panel, wherein each said orifice is positioned in said panel such that said orifice is positioned for inserting a respective said tube, wherein said lip is positioned on said tube such that said lip is positioned for contacting said panel for coupling said respective said tube to said panel such that said respective said tube is configured for selectively inserting a respective cup and respective articles, such as respective lures, for selectively coupling the respective cup and the respective articles to said panel.

\* \* \* \* \*